(12) United States Patent
Wondergem-De Best et al.

(10) Patent No.: US 10,443,813 B2
(45) Date of Patent: Oct. 15, 2019

(54) LENS WITH SLITS

(71) Applicant: SIGNIFY HOLDING B.V., Eindhoven (NL)

(72) Inventors: Anna Wilhelmina Maria Wondergem-De Best, Veldhoven (NL); Michel Cornelis Josephus Marie Vissenberg, Roermond (NL); Johannes Petrus Maria Ansems, Hulsel (NL); Ludovicus Johannes Lambertus Haenen, Sint Oedenode (NL); Dirk Jan Van Kaathoven, Eindhoven (NL)

(73) Assignee: SIGNIFY HOLDING B.V..

( * ) Notice: Subject to any disclaimer, the term of this patent is extended or adjusted under 35 U.S.C. 154(b) by 0 days.

(21) Appl. No.: 16/085,113

(22) PCT Filed: Apr. 4, 2017

(86) PCT No.: PCT/EP2017/057996
§ 371 (c)(1),
(2) Date: Sep. 14, 2018

(87) PCT Pub. No.: WO2017/174585
PCT Pub. Date: Oct. 12, 2017

(65) Prior Publication Data
US 2019/0128502 A1  May 2, 2019

(30) Foreign Application Priority Data

Apr. 7, 2016 (EP) .................................... 16164166

(51) Int. Cl.
*F21V 5/04* (2006.01)
*G02B 19/00* (2006.01)
(Continued)

(52) U.S. Cl.
CPC ............ *F21V 5/041* (2013.01); *F21V 7/0091* (2013.01); *G02B 19/0028* (2013.01);
(Continued)

(58) Field of Classification Search
CPC ...... F21V 5/04; F21V 7/0091; F21Y 2113/10; F21Y 2113/13; F21Y 2115/10; G02B 19/0028; G02B 19/0066
See application file for complete search history.

(56) References Cited

U.S. PATENT DOCUMENTS 5,101,325 A * 3/1992 Davenport ........... G02B 6/0008
362/628
10,133,029 B2 * 11/2018 Wang .................. G02B 19/0071
(Continued)

FOREIGN PATENT DOCUMENTS

GB  2425615 B  11/2006
JP  58196067 A  11/1983
(Continued)

*Primary Examiner* — Peggy A Neils
(74) *Attorney, Agent, or Firm* — Daniel J. Piotrowski

(57) ABSTRACT

A lens (1) comprising a centrally extending axis (A) being perpendicular to a lens axis (L) of the lens, the lens being adapted for retracting light rays from a light source positioned off-axis with respect to the centrally extending axis, the lens comprising a first plurality of slits (21, 22, 23, 24) extending entirely in an interior of the lens and comprising a length (l) extending perpendicular to the centrally extending axis, a width (w) extending parallel to the centrally extending axis and a thickness (t) extending perpendicular to both the length and the width, the first plurality of slits being mutually parallel and covering between 40% and 60% of a plane in which both the centrally extending axis (A) and the length (l) and width (w) of the first plurality of slits (21, 22, 23, 24) extend.

15 Claims, 3 Drawing Sheets

(51) Int. Cl.
 *F21V 7/00* (2006.01)
 *F21Y 115/10* (2016.01)
 *F21Y 113/13* (2016.01)
 *F21Y 113/10* (2016.01)

(52) U.S. Cl.
 CPC ....... *G02B 19/0066* (2013.01); *F21Y 2113/10* (2016.08); *F21Y 2113/13* (2016.08); *F21Y 2115/10* (2016.08)

(56) References Cited

U.S. PATENT DOCUMENTS

| 2006/0289885 | A1 | 12/2006 | Chen |
| 2011/0073183 | A1* | 3/2011 | Byun ........................ G02B 3/08 136/259 |
| 2015/0276168 | A1* | 10/2015 | Malkmus ........... G02B 19/0066 362/235 |
| 2016/0025296 | A1 | 1/2016 | Bigliatti et al. |

FOREIGN PATENT DOCUMENTS

| JP | 2005353506 A | 12/2005 |
| JP | 2009266516 A | 11/2009 |
| JP | 50-38755 B2 | 10/2012 |

* cited by examiner

LENS WITH SLITS

CROSS-REFERENCE TO PRIOR APPLICATIONS

This application is the U.S. National Phase application under 35 U.S.C. § 371 of International Application No. PCT/EP2017/057996, filed on Apr. 4, 2017 which claims the benefit of European Patent Application No. 16164166.7, filed on Apr. 7, 2016. These applications are hereby incorporated by reference herein.

FIELD OF THE INVENTION

The invention relates to a lens comprising a centrally extending axis being perpendicular to a lens axis of the lens, the lens being adapted for refracting light rays from a light source positioned off-axis with respect to the centrally extending axis. The invention furthermore relates to a collimator with such a lens and to a lighting device comprising such a lens.

BACKGROUND OF THE INVENTION

Color inhomogeneity is an issue in many LED products. Color inhomogeneities arise due to color over position (CoP) and color over angle (CoA) for single LEDs, slightly different color temperatures for products where multiple LEDs are used, different color temperatures for products that can vary in overall color temperature (from warm white to cool white), and completely different colors for products that contain colored LEDs (for instance red, green and blue LEDs).

In present-day LED lamps and LED modules the color issues are solved using diffusers (often in combination with a mixing chamber) or mixing rods. However diffusers cause a lower system efficiency, and mixing rods require relatively large amounts of space.

Another attempt at solving the above-mentioned color issues is described in JP 50-38755 B2 disclosing a LED luminaire comprising a lens arranged over a plurality of LEDs. The lens comprises, seen in a planar view, several radially extending V-grooves provided in an outer surface of the lens such that the lens has an uneven or corrugated surface structure. The uneven or corrugated surface structure is provided in a cross sectional plane being parallel to the optical extraction surface of each of the plurality of LEDs. In addition to insufficient color mixing, this solution, however, necessitates an overly complex lens surface structure and is thus expensive to manufacture.

SUMMARY OF THE INVENTION

It is an object of the present invention to overcome the problems related to the above color mixing issues, and to provide a lens with which a light output having a high degree of color homogeneity is obtained while maintaining a low amount of light loss and thus a high intensity of the resulting emitted light, and which lens is furthermore simple and straight-forward to produce.

According to a first aspect of the invention, this and other objects are achieved by means of a lens comprising a centrally extending axis being perpendicular to a lens axis of the lens, the lens being adapted for refracting light rays from a light source positioned off-axis with respect to the centrally extending axis, the lens comprising a first plurality of slits extending entirely in an interior of the lens and comprising a length, l, extending perpendicular to the centrally extending axis, a width, w, extending parallel to the centrally extending axis and a thickness, t, extending perpendicular to both the length, l, and the width, w, the first plurality of slits being mutually parallel and covering between 40% and 60% of a plane in which both the centrally extending axis and the length, l, and width, w, of the first plurality of slits extend.

Thereby a lens is provided with which the thus provided slits are adapted for and arranged to cause about half of the light rays that cross the plane in which both the centrally extending axis and the length and width of the first plurality of slits extend and hit a slit to be reflected while the other rays of light that do not encounter the slits travel along in the initial direction. Put in other words, the thus provided slits are adapted for and arranged to cause light rays that hit a slit to be reflected without losses if the angle of incidence is higher than $\mathrm{asin}(n_s/n)$, where n is the refractive index of the lens and where $n_s$ is the refractive index of the slit, and to cause light rays that hit the slit with a smaller angle as well as light rays that do not hit a slit to continue in the initial direction.

When a first light source and a second light source are arranged on mutually opposite sides of the plane in which both the centrally extending axis and the length and width of the first plurality of slits extend, the result thus is that about half of the rays coming from the first light source and about half of the rays coming from the second light source will be reflected at the slits along the said plane. Consequently, about half of the rays from the first light source seem to come from the position of the second light source and vice versa. This creates the effect that the thus reflected rays of light appear to an external viewer to come from the position of the other light source and that the light is thus mixed.

Providing the first plurality of slits extending entirely in an interior of the lens provides for a lens with an uninterrupted surface which in turn avoids the presence of artifacts otherwise occurring due to the interruptions.

Providing the first plurality of slits such as to cover between 40% and 60% of a plane in which both the centrally extending axis and the length, l, and width, w, of the first plurality of slits extend provides for a lens with which the light distribution between the two parts of the lens on each side of the said plane becomes even, which in turn provides a lens with particularly good light mixing properties.

Thus, a lens is provided with which incident light of different colors is mixed to a high degree thus obtaining a light output with high color homogeneity while maintaining a low amount of light loss and thus a high intensity of the resulting emitted light, and which lens is furthermore simple and straight-forward to produce.

In an embodiment the first plurality of slits cover 50% of the plane in which both the centrally extending axis and the length, l, and width, w, of the first plurality of slits extend.

Thereby half of the rays coming from the first light source and half of the rays coming from the second light source will be reflected at the slits along the said plane. Consequently, half of the rays from the first light source seem to come from the position of the second light source and vice versa. Thus, a lens provided with a particularly high degree of color mixing is obtained, thus obtaining a light output with particularly high color homogeneity.

In an embodiment the lens further comprises a second plurality of slits extending entirely in the interior of the lens and comprising a length extending perpendicular to the centrally extending axis, a width extending parallel to the centrally extending axis and a thickness extending perpendicular to both the length and the width, the second plurality of slits being mutually parallel and covering between 40 and 60% of a plane in which both the centrally extending axis and the length and width of the second plurality of slits extend, the second plurality of slits extending in an angle different from zero with respect to the first plurality of slits.

In an embodiment the second plurality of slits cover 50% of the plane in which both the centrally extending axis and the length and width of the second plurality of slits extend.

Apart from providing effects similar to those described above, a lens is hereby provided with which light from a higher number, particularly four, light sources may be mixed with a high degree of color mixing, thus obtaining a light output with not only high color homogeneity but also increased intensity.

In an embodiment the lens further comprises a third plurality of slits extending entirely in the interior of the lens and comprising a length extending perpendicular to the centrally extending axis, a width extending parallel to the centrally extending axis and a thickness extending perpendicular to both the length and the width, the third plurality of slits being mutually parallel and covering between 40 and 60% of a plane in which both the centrally extending axis and the length and width of the third plurality of slits extend, the third plurality of slits extending in an angle different from zero with respect to both the first plurality of slits and the second plurality of slits.

In an embodiment the third plurality of slits cover 50% of the plane in which both the centrally extending axis and the length and width of the third plurality of slits extend.

Apart from providing effects similar to those described above, a lens is hereby provided with which light from a higher number, particularly three, of light sources with mutually different colors may be mixed with a high degree of color mixing, thus obtaining a light output with a particularly high color homogeneity.

In other embodiments one or more further pluralities of slits may be provided in a way similar to that described for the third plurality of slits above.

In an embodiment is the refractive index $n_s$ of the slits is one, thereby providing for a particularly simple lens as the slits may simply be provided as air filled slits.

In an embodiment any one or more of the first plurality of slits, the second plurality of slits and the third plurality of slits terminate in a distance from an outer surface of the lens.

Thereby a lens having a continuous surface is provided for, which in turn provides for a lower light loss and thus higher intensity of the emitted light.

In an embodiment the width of each slit of any one or more of the first plurality of slits, the second plurality of slits and the third plurality of slits is between 0.1 mm and ¼ of the height of the lens measured along the centrally extending axis A.

In an embodiment the distance between adjacent slits of any one or more of the first plurality of slits, the second plurality of slits and the third plurality of slits is between 0.1 mm and ¼ of the height of the lens measured along the centrally extending axis A.

The lower limit of each of the two above embodiments is chosen to ensure that the width of the slits and distance between adjacent slits, respectively is well above the wavelength of light to be mixed by the lens. Thereby the number of artifacts created by the light interacting with the slits is reduced.

The upper limit of each of the two above embodiments is chosen to ensure that the width of the slits and distance between adjacent slits, respectively, is of such a magnitude that an even distribution of slits and space between adjacent slits is ensured. Thereby, an improved color mixing is obtained. Furthermore, a lens according to the invention will in this way also be applicable to large optical systems.

In an embodiment the thickness of each slit of any one or more of the first plurality of slits, the second plurality of slits and the third plurality of slits is larger than 1000 nm.

Thereby it is ensured that the slits take up as little space as possible within the lens while still ensuring sufficient and efficient color mixing. Furthermore, it is ensured that the minimum thickness of the slits is in the order of the maximum wavelength of the generated light. Namely, if the thickness is too low, some rays will leak, depending on the wavelength, which is known as frustrated TIR or evanescent waves. Frustrated TIR or evanescent waves may thereby be avoided.

In an embodiment the slits are arranged such with respect to the centrally extending axis that half the thickness of the slits extend on each side of the centrally extending axis. Thereby it is ensured that the slits take up an even amount of space within each half of the lens while still ensuring sufficient and efficient color mixing.

In an embodiment end surfaces of the slits of any one or more of the first plurality of slits, the second plurality of slits and the third plurality of slits facing towards adjacent slits are lambertian scattering.

Thereby the number of artifacts created by the light interacting with the slits may be hidden at least partially and possible completely.

In an embodiment a part of an outer surface of the lens is at least partially diffusive.

Thereby a lens with even further improved color mixing properties is provided for.

The invention furthermore relates to a collimator comprising a lens according to the invention and thus providing a light output which is not only highly collimated, but also a particularly high degree of color mixing.

The invention furthermore relates to a lighting device comprising a lens according to any one of the above claims and at least two light sources adapted for, in operation, emitting light, the at least two light sources being positioned spaced apart and off-axis with respect to the centrally extending axis. Thereby a light emitting device with a light output of a particularly well mixed and high quality is provided for.

In an embodiment of the lighting device according to the invention the width of each slit of any one or more of the first plurality of slits, the second plurality of slits and the third plurality of slits is chosen such as to be larger than a wavelength of the light emitted by the at least two light sources and smaller than a distance between the at least two light sources.

The lower limit of the width is chosen to ensure that the width of the slits and distance between adjacent slits, respectively is well above the wavelength of light to be mixed by the lens. Thereby the number of artifacts created by the light interacting with the slits is reduced.

The upper limit of the width is chosen to ensure that the width of the slits and distance between adjacent slits, respectively, is of such a magnitude that an even distribution of slits and space between adjacent slits is ensured. Thereby, an improved color mixing is obtained.

In an embodiment of the lighting device according to the invention the thickness of each slit of any one or more of the first plurality of slits, the second plurality of slits and the third plurality of slits is chosen such as to be larger than a wavelength of the light emitted by the at least two light sources.

Thereby it is ensured that the slits take up as little space as possible within the lens while still ensuring sufficient and efficient color mixing.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figures 1, 2:
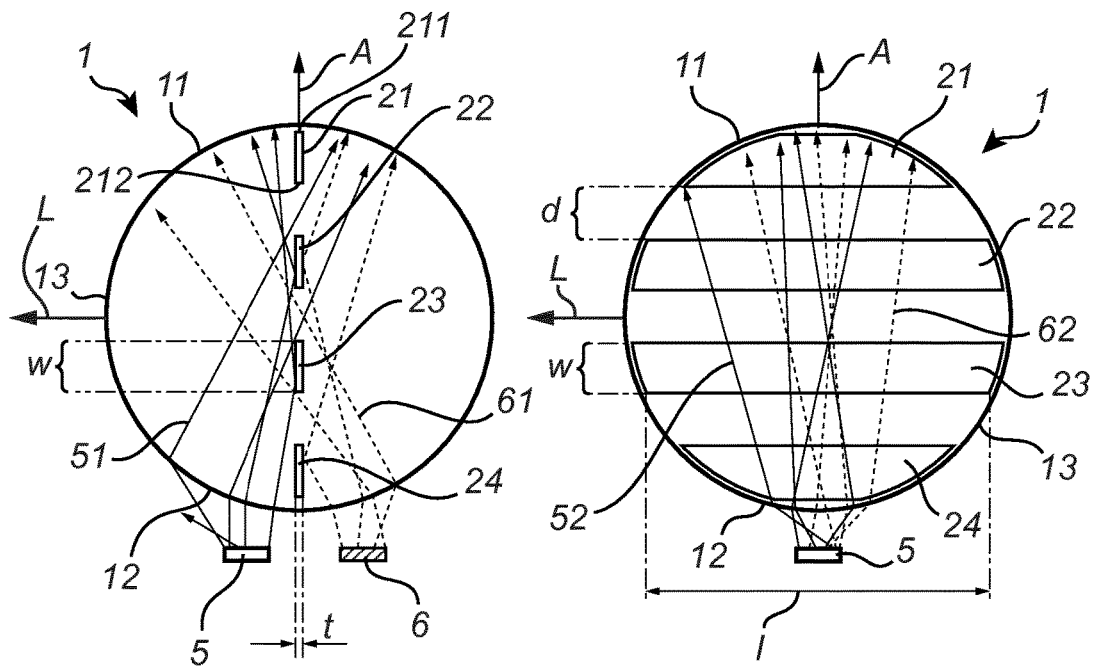
FIG. 1 shows a lens according to a first embodiment of the invention and comprising a first plurality of slits in a cross sectional view in a plane perpendicular to a plane in which both a centrally extending axis being perpendicular to a lens axis of the lens and the length and the width of a first plurality of slits extend.
FIG. 2 shows the lens according to FIG. 1 in a cross sectional views in a plane in which both a centrally extending axis being perpendicular to a lens axis of the lens and the length and the width of a first plurality of slits extend.

FIGS. 1 and 2 show a lens 1 according to a first embodiment of the invention in mutually perpendicular cross sectional views. The lens 1 comprises a lens axis L, an outer surface 13, a centrally extending axis A being perpendicular to the lens axis L and a first plurality of slits 21, 22, 23, 24.

The first plurality of slits 21, 22, 23, 24 extend entirely in an interior of the lens. The first plurality of slits 21, 22, 23, 24 comprise a length, l, extending perpendicular to the centrally extending axis A, a width, w, extending parallel to the centrally extending axis A and a thickness, t, extending perpendicular to both the length, l, and the width, w. The slits of the first plurality of slits 21, 22, 23, 24 are mutually parallel. The first plurality of slits 21, 22, 23, 24 cover in the embodiment shown a total of about 50% of a plane in which both the centrally extending axis A and the length 1 and width w of the first plurality of slits 21, 22, 23, 24 extend—cf. FIG. 2.

Thus, as shown in the figures and irrespective of the embodiment the lens axis L may be seen as a horizontally extending axis, while the centrally extending axis A may be seen as a vertical axis. Likewise, and also irrespective of the embodiment, the plane in which both the centrally extending axis A and the length and width of a given plurality of slits extend may be seen as a vertically extending plane or simply vertical plane.

Adjacent slits of the first plurality of slits 21, 22, 23, 24 are arranged spaced apart with a distance d. Furthermore, the slits of the first plurality of slits 21, 22, 23, 24 are arranged such as to terminate in a distance from the outer surface 13 of the lens 1. Alternatively, the slits of the first plurality of slits 21, 22, 23, 24 may be arranged such as to terminate at the outer surface 13 of the lens 1.

It is noted that irrespective of the embodiment the length, width and thickness of the slits of the respective pluralities of silts as well as the distance between adjacent slits of a plurality of slits may vary. Thus, all slits need not have the same length, width and/or thickness, but may have different lengths, widths and/or thicknesses. Likewise the distance between adjacent slits of a plurality of slits may vary within a plurality of slits and/or between different pluralities of slits.

In FIGS. 1 and 2 two light sources 5, 6 emitting light rays 51, 52, 61, 62 are shown such as to illustrate the path of the light rays 51, 52, 61, 62 through the lens 1. In FIG. 2 only the light source 5 is visible, the other light source 6 being hidden behind the light source 5. The light sources 5 and 6 emit light of two different colors, for example red and blue. The light sources 5 and 6 may be two differently colored LEDs.

The two light sources 5, 6 are arranged off axis with respect to the centrally extending axis A, i.e. on mutually opposite sides of the plane in which both the centrally extending axis A and the length, l, and width, w, of the first plurality of slits 21, 22, 23, 24 extend and in the same distance from the said plane.

The lens 1 is provided with a first surface part or segment 12 adapted for receiving and coupling light into the lens 1 as well as a second surface part or segment 11 adapted for coupling mixed light out of the lens 1. The second surface part or segment 11 of the lens 1 may be diffusing or scattering.

Light emitted by the two light sources 5, 6 is thus coupled into the lens 1 at the first surface segment 12. When propagating through the lens 1, about half of the rays 51, 52 coming from the light source 5 and about half of the rays 61, 62 coming from the light source 6 will hit a slit of the first plurality of slits 21, 22, 23, 24 and be reflected at the slits 21, 22, 23, 24 along the plane in which both the centrally extending axis A and the length, l, and width, w, of the first plurality of slits 21, 22, 23, 24 extend—cf. FIG. 1. Similarly, about half of the rays 51, 52 coming from the light source 5 and about half of the rays 61, 62 coming from the light source 6 will not hit a slit of the first plurality of slits 21, 22, 23, 24 and will thus cross the plane in which both the centrally extending axis A and the length, l, and width, w, of the first plurality of slits 21, 22, 23, 24 extend—cf. likewise FIG. 1. The light is thus mixed. Finally the thus mixed light is emitted through the second surface part or segment 11 of the lens 1. In case the second surface part or segment 11 of the lens 1 is diffusive or scattering a further mixing of the light will be obtained.

Figure 4:
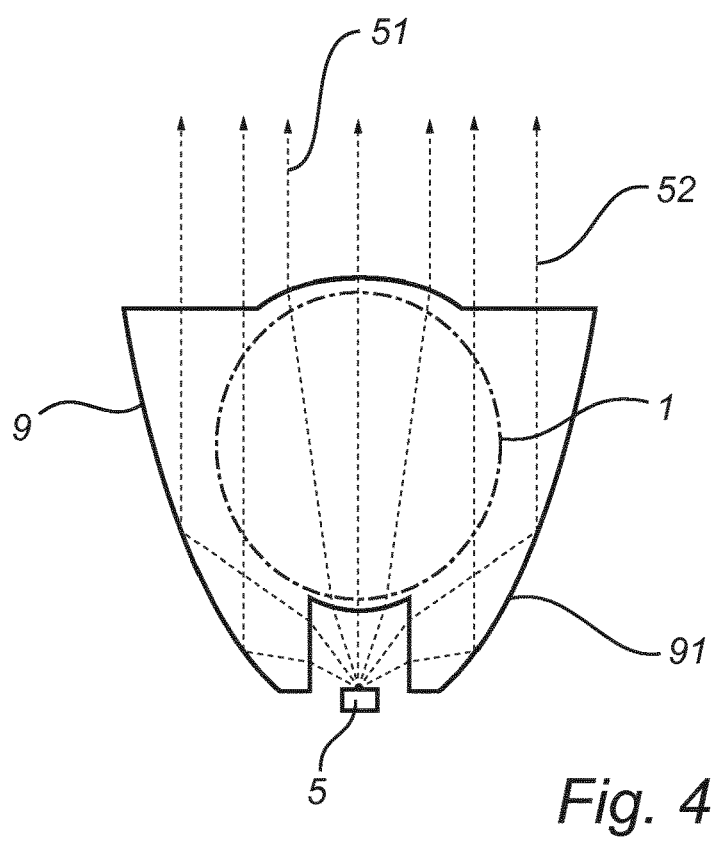
FIG. 4 shows a schematic view of a collimator comprising a lens according to the invention.

FIG. 4 illustrates schematically a collimator 9 comprising a lens 1 according to the invention. Any lens according to the invention may be employed in a collimator. The lens 1 is arranged centrally in the collimator 9. Also the collimator comprises a TIR surface 91. Thereby light emitted by a light source 5 and propagating though the collimator 9 comprising the lens 1 is eventually emitted as both collimated and mixed light 51, 52.

Figure 3:
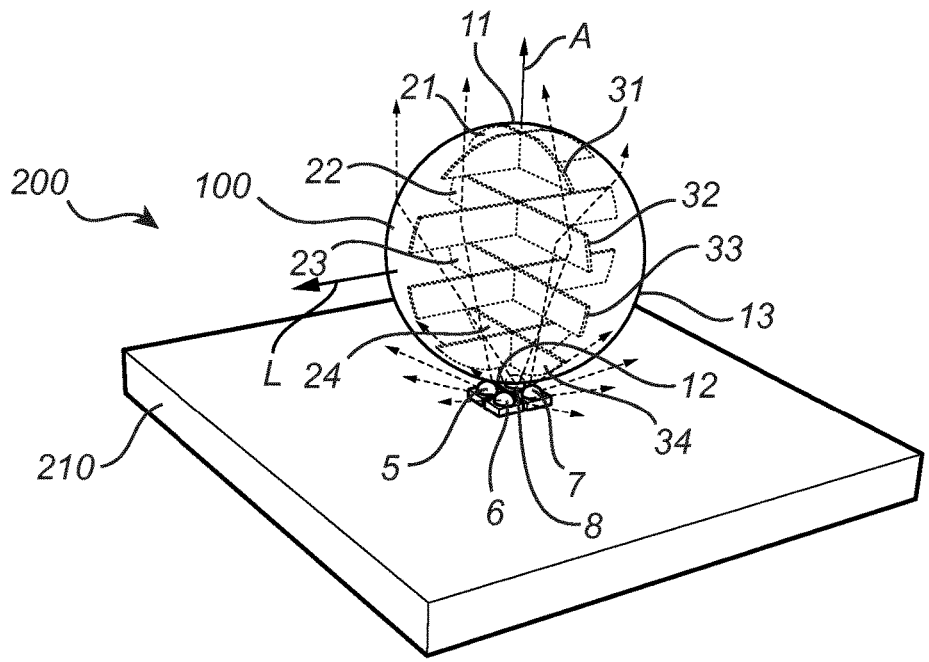
FIG. 3 shows a perspective view of a lighting device according to the invention comprising a plurality of light sources and a lens according to a second embodiment of the invention and comprising a first and a second plurality of slits.

Turning now to FIG. 3, a perspective view of a lighting device 200 according to the invention is shown. The lighting device 200 comprises four light sources 5, 6, 7, 8 arranged on a base 210 such as a printed circuit board. Two of the light sources, namely light sources 5 and 7, emit light of one specific color, e.g. green, while the other two of the light sources, namely light sources 6 and 8 emit light of another specific color, e.g. red. The lighting device 200 further comprises a second embodiment of a lens 100 according to the invention.

The lens 100 of the lighting device 200 differs from that shown in FIGS. 1 and 2 and described above in that it further comprises a second plurality of slits 31, 32, 33, 34.

The second plurality of slits 31, 32, 33, 34 extend entirely in an interior of the lens. Similarly to the first plurality of slits 21, 22, 23, 24, the second plurality of slits 31, 32, 33, 34 comprise a length extending perpendicular to the centrally extending axis A, a width extending parallel to the centrally extending axis A and a thickness extending perpendicular to both the length and the width. The slits of the second plurality of slits 31, 32, 33, 34 are mutually parallel. The second plurality of slits 31, 32, 33, 34 cover in the embodiment shown in FIG. 3 a total of about 50% of a plane in which both the centrally extending axis A and the length and width of the second plurality of slits 31, 32, 33, 34 extend.

The second plurality of slits 31, 32, 33, 34 furthermore generally extend in an angle different from zero with respect to the first plurality of slits 21, 22, 23, 24. In an embodiment the second plurality of slits 31, 32, 33, 34 and the first plurality of slits 21, 22, 23, 24 extend in such an angle with respect to each other that the second plurality of slits 31, 32, 33, 34 and the first plurality of slits 21, 22, 23, 24 are radially evenly distributed when seen in a plane perpendicular to the centrally extending axis A. In the embodiment shown in FIG. 3, the second plurality of slits 31, 32, 33, 34 extend in an angle of 90 degrees with respect to the first plurality of slits 21, 22, 23, 24.

Adjacent slits of the second plurality of slits 31, 32, 33, 34 are arranged spaced apart with a distance corresponding to the distance d between adjacent slits of the first plurality of slits 21, 22, 23, 24. Alternatively, adjacent slits of the second plurality of slits 31, 32, 33, 34 may be arranged spaced apart with a distance differing from the distance d between adjacent slits of the first plurality of slits 21, 22, 23, 24.

Furthermore, the slits of the second plurality of slits 31, 32, 33, 34 are arranged such as to terminate in a distance from the outer surface 13 of the lens 100. Alternatively, the slits of the second plurality of slits 31, 32, 33, 34 may be arranged such as to terminate at the outer surface 13 of the lens 100.

The four light sources 5, 6, 7, 8 are arranged off axis with respect to the centrally extending axis A. More particularly, the four light sources 5, 6, 7, 8 are arranged pair-wise on mutually opposite sides of the plane in which both the centrally extending axis A and the length, l, and width, w, of the first plurality of slits 21, 22, 23, 24 extend and in the same distance from the said plane, and on mutually opposite sides of the plane in which both the centrally extending axis A and the length and width of the second plurality of slits 31, 32, 33, 34 extend and in the same distance from the said plane, respectively.

Light emitted by the four light sources 5, 6, 7, 8 is thus coupled into the lens 100 at the first surface segment 12. When the light emitted by the four light sources 5, 6, 7, 8 propagates through the lens 100, about half of the rays coming from each of the four light sources 5, 6, 7, 8 will hit a slit of the first plurality of slits 21, 22, 23, 24 or the second plurality of slits 31, 32, 33, 34 and be reflected at the said slit along the relevant plane—cf. FIG. 3. Furthermore, about a quarter of the rays coming from each of the four light sources 5, 6, 7, 8 will not hit a slit of the first plurality of slits 21, 22, 23, 24 and will thus cross the plane in which both the centrally extending axis A and the length, l, and width, w, of the first plurality of slits 21, 22, 23, 24 extend—cf. likewise FIG. 3. Similarly, about a quarter of the rays coming from each of the four light sources 5, 6, 7, 8 will not hit a slit of the second plurality of slits 31, 32, 33, 34 and will thus cross the plane in which both the centrally extending axis A and the length and width of the second plurality of slits 31, 32, 33, 34 extend—cf. likewise FIG. 3. The light is thus mixed. Finally the thus mixed light is emitted through the second surface part or segment 11 of the lens 100. In case the second surface part or segment 11 of the lens 100 is diffusive or scattering a further mixing of the light will be obtained.

The light mixing effect of a lens 100 in a lighting device 200 as described above is illustrated by means of FIGS. 5A to 5D. The lighting device 200 comprises two light sources emitting red light and two light sources emitting green light. In FIGS. 5A to 5D the light emitted by the lighting device 200 is represented by grey scale tones such that grey corresponds to red light and white corresponds to green light, while black corresponds to mixed light.

Figure 5A:
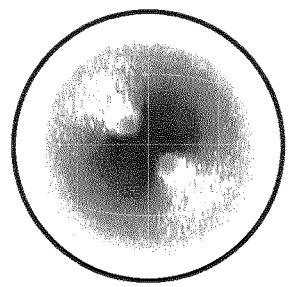
FIGS. 5A and 5B show plots of the intensity distribution of a lighting device according to FIG. 3 in which the lens comprises no slits and in which a part of the surface of the lens adapted for emitting light received from the light sources is 1 degree Gaussian scattering and 10 degrees Gaussian scattering, respectively.
Figure 5C:
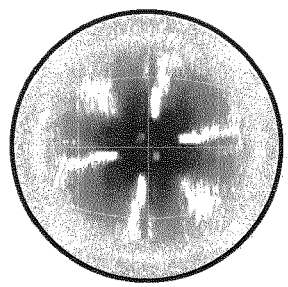
FIGS. 5C and 5D show plots of the intensity distribution of a lighting device according to FIG. 3 in which the lens comprises a first and a second plurality of slits and in which a part of the surface of the lens adapted for emitting light received from the light sources is 1 degree Gaussian scattering and 10 degrees Gaussian scattering, respectively.
Figure 5B:
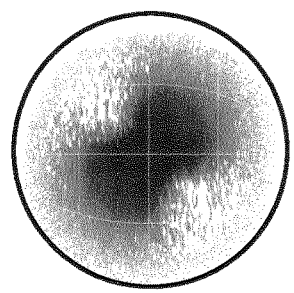

FIGS. 5A and 5B show plots of the intensity distribution of a lighting device of the type shown in FIG. 3 but comprising a lens having no slits and in which a part of the surface of the lens adapted for emitting light received from the light sources is 1 degree Gaussian scattering (FIG. 5A) and 10 degrees Gaussian scattering (FIG. 5B), respectively. As may be seen from FIG. 5A, the color intensity distribution plot made using a lens with no slits clearly shows four areas of virtually unmixed colors, namely two grey and two white areas. FIG. 5B illustrates that even when the part of the surface of the lens adapted for emitting light received from the light sources is scattering, the areas with unmixed colors do not disappear.

Figure 5D:
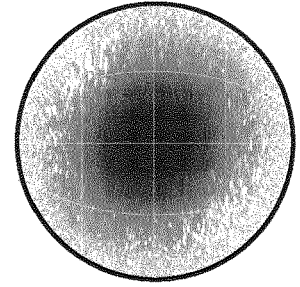

FIGS. 5C and 5D show plots of the intensity distribution of a lighting device according to FIG. 3 in which the lens 100 comprises a first plurality of slits 21, 22, 23, 24 and a second plurality of slits 31, 32, 33, 34 and in which a part 11 of the surface 13 of the lens 100 adapted for emitting light received from the light sources 5, 6, 7, 8 is 1 degree Gaussian scattering (FIG. 5C) and 10 degrees Gaussian scattering (FIG. 5D), respectively. FIG. 5C illustrates that when using a lens 100 with slits the colors are well mixed, although some artifacts, shown as a grey dotted shadow in FIG. 5C, appear along the rim of the distribution plot. FIG. 5D illustrates that the said artifacts may easily be smoothened out and the color mixing improved further, when the part 11 of the surface 13 of the lens 100 adapted for emitting light received from the light sources 5, 6, 7, 8 is scattering.

Figure 6:
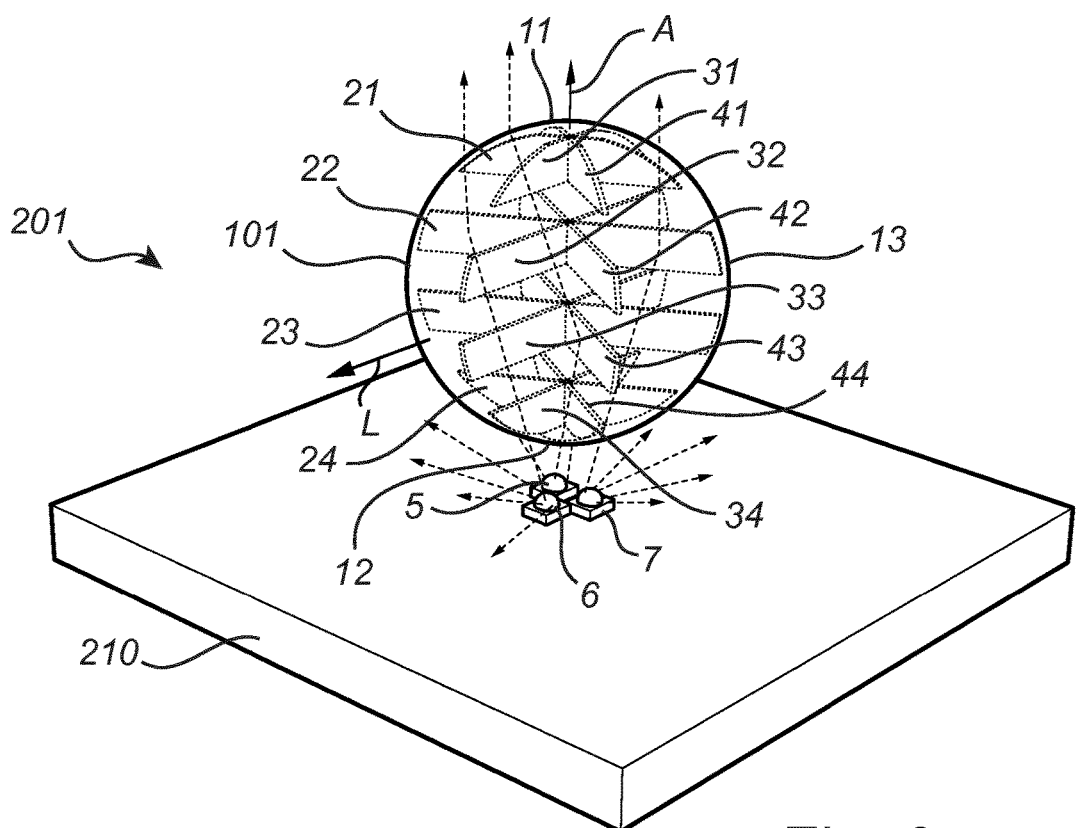
FIG. 6 shows a perspective view of a lighting device according to the invention comprising a plurality of light sources and a lens according to a third embodiment of the invention and comprising a first, a second and a third plurality of slits.

Turning now to FIG. 6, a perspective view of another lighting device 201 according to the invention is shown. The lighting device 201 comprises three light sources 5, 6, 7 arranged on a base 210 such as a printed circuit board. The three light sources emit light of mutually different colors. For instance, a first one of the light sources emits green light, a second one emits red light and a third one emits blue light. The lighting device 200 further comprises a third embodiment of a lens 101 according to the invention.

The lens 101 of the lighting device 201 differs from that shown in FIG. 3 and described above in that it further comprises a third plurality of slits 41, 42, 43, 44.

The third plurality of slits 41, 42, 43, 44 extend entirely in an interior of the lens. Similarly to the first plurality of slits 21, 22, 23, 24, the third plurality of slits 41, 42, 43, 44 comprise a length extending perpendicular to the centrally extending axis A, a width extending parallel to the centrally extending axis A and a thickness extending perpendicular to both the length and the width. The slits of the third plurality of slits 41, 42, 43, 44 are mutually parallel. The third plurality of slits 41, 42, 43, 44 cover in the embodiment shown in FIG. 6 a total of about 50% of a plane in which both the centrally extending axis A and the length and width of the third plurality of slits 41, 42, 43, 44 extend.

The third plurality of slits 41, 42, 43, 44 furthermore generally extend in an angle different from zero with respect to both the first plurality of slits 21, 22, 23, 24 and the second plurality of slits 31, 32, 33, 34. In an embodiment the third plurality of slits 41, 42, 43, 44, the second plurality of slits 31, 32, 33, 34 and the first plurality of slits 21, 22, 23, 24 extend in such an angle with respect to each other that the third plurality of slits 41, 42, 43, 44, the second plurality of slits 31, 32, 33, 34 and the first plurality of slits 21, 22, 23, 24 are radially evenly distributed when seen in a plane perpendicular to the centrally extending axis A. In the embodiment shown in FIG. 6, the third plurality of slits 41, 42, 43, 44 extend in an angle of 60 degrees with respect to both the second plurality of slits 31, 32, 33, 34 and the first plurality of slits 21, 22, 23, 24.

Adjacent slits of the third plurality of slits 41, 42, 43, 44 are arranged spaced apart with a distance corresponding to the distance d between adjacent slits of the first plurality of slits 21, 22, 23, 24. Alternatively, adjacent slits of the third plurality of slits 41, 42, 43, 44 may be arranged spaced apart with a distance differing from the distance d between adjacent slits of the first plurality of slits 21, 22, 23, 24 and/or differing from the distance between adjacent slits of the second plurality of slits 31, 32, 33, 34.

Furthermore, the slits of the third plurality of slits 41, 42, 43, 44 are arranged such as to terminate in a distance from the outer surface 13 of the lens 101. Alternatively, the slits of the third plurality of slits 41, 42, 43, 44 may be arranged such as to terminate at the outer surface 13 of the lens 101.

The three light sources 5, 6, 7 are arranged off axis with respect to the centrally extending axis A. More particularly, the three light sources 5, 6, 7 are arranged evenly distributed around the vertically extending central lens axis A. More particularly, and in the embodiment shown, the light source 5 is arranged directly under the first plurality of slits 21, 22, 23, 24, the light source 6 is arranged directly under the second plurality of slits 31, 32, 33, 34 and the light source 7 is arranged directly under the third plurality of slits 41, 42, 43, 44.

Light emitted by the three light sources 5, 6, 7 is thus coupled into the lens 101 at the first surface segment 12. When light propagating through the lens 101, about half of the rays coming from each of the three light sources 5, 6, 7 will hit the slits of the first plurality of slits 21, 22, 23, 24, the second plurality of slits 31, 32, 33, 34 and the third plurality of slits 41, 42, 43, 44 in such a way that each plurality of slits causes a virtual overlap of light emitted by two neighboring light sources—cf. FIG. 6. The light is thus mixed. Finally the thus mixed light is emitted through the second surface part or segment 11 of the lens 101. In case the second surface part or segment 11 of the lens 101 is diffusive or scattering a further mixing of the light will be obtained.

The light mixing effect of a lens 101 in a lighting device 201 as described above is illustrated by means of FIGS. 7A to 7D. The lighting device 201 comprises three light sources one emitting red light, one emitting green light and one emitting blue light. In FIGS. 7A to 7D the light emitted by the lighting device 201 is represented by grey scale tones such that white corresponds to red light, light grey to blue light and dark grey corresponds to green light, while black corresponds to mixed light.

Figure 7A:
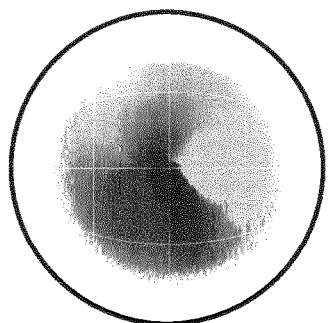
FIGS. 7A and 7B show plots of the intensity distribution of a lighting device according to FIG. 6 in which the lens comprises no slits and in which a part of the surface of the lens adapted for emitting light received from the light sources is 1 degree Gaussian scattering and 10 degrees Gaussian scattering, respectively.
Figure 7C:
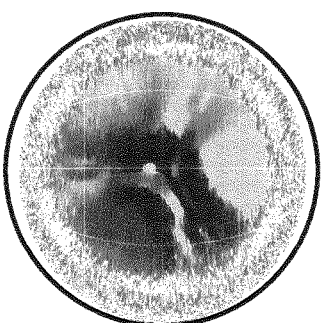
FIGS. 7C and 7D show plots of the intensity distribution of a lighting device according to FIG. 6 in which the lens comprises a first, a second and a third plurality of slits and in which a part of the surface of the lens adapted for emitting light received from the light sources is 1 degree Gaussian scattering and 10 degrees Gaussian scattering, respectively.
Figure 7B:
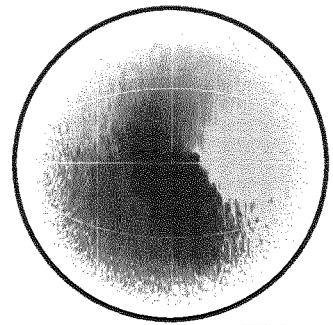

FIGS. 7A and 7B show plots of the intensity distribution of a lighting device according to FIG. 6 but comprising a lens with no slits and in which a part of the surface of the lens adapted for emitting light received from the light sources is 1 degree Gaussian scattering (FIG. 7A) and 10 degrees Gaussian scattering (FIG. 7B), respectively. As may be seen from FIG. 7A, the color intensity distribution plot made using a lens with no slits clearly shows areas of virtually unmixed colors, namely light grey, dark grey and white areas. FIG. 7B illustrates that even when the part of the surface of the lens adapted for emitting light received from the light sources is scattering, the areas with unmixed colors do not disappear.

Figure 7D:
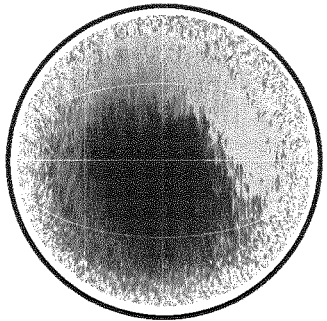

FIGS. 7C and 7D show plots of the intensity distribution of a lighting device 201 according to FIG. 6 in which the lens 101 comprises a first plurality of slits 21, 22, 23, 24, a second plurality of slits 31, 32, 33, 34 and a third plurality of slits 41, 42, 43, 44 and in which a part 11 of the surface 13 of the lens 101 adapted for emitting light received from the light sources is 1 degree Gaussian scattering (FIG. 7C) and 10 degrees Gaussian scattering (FIG. 7D), respectively. FIG. 7C illustrates that when using a lens 101 with slits the colors are well mixed, although some distinct unmixed areas remain. FIG. 7D illustrates that the remaining distinct unmixed areas may be smoothened out and the color mixing improved further, when the part 11 of the surface 13 of the lens 100 adapted for emitting light received from the light sources 5, 6, 7, 8 is scattering.

Finally, it is noted that lenses according to the invention are simple to manufacture. For example, a lens 1 according to the first embodiment and as shown in FIGS. 1 and 2 may be made by combining two half lenses. A first example of such two half lenses are one half with protrusions and one part with a flat surface, where the protrusions and the flat surface is joined, e.g. glued, together. A second example of such two half lenses are two parts both having a flat surface, where the flat surfaces are joined, e.g. glued, together with a multilayer or perforated foil in between. A third example of such two half lenses are two parts both having a flat surface, where the two flat surfaces are glued together with thick glue dots. Lenses 100 and 101 according to the second and third embodiments, respectively may be manufactured in an analogous manner by joining four lens parts or six lens parts, respectively.

Also, it is feasible to provide a lens according to the invention with more than three pluralities of slits such as to enable mixing of light from an even larger number of light sources, possibly emitting light of even more different colors.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lens comprising a centrally extending axis (A) being perpendicular to a lens axis (L) of the lens, the lens being adapted for refracting light rays from a light source positioned off-axis with respect to the centrally extending axis, the lens comprising a first plurality of slits extending entirely in an interior of the lens and comprising a length (l) extending perpendicular to the centrally extending axis, a width (w) extending parallel to the centrally extending axis and a thickness (t) extending perpendicular to both the length and the width, the first plurality of slits being mutually parallel and covering between 40% and 60% of a plane in which both the centrally extending axis (A) and the length (l) and width (w) of the first plurality of slits extend.

2. A lens according to claim 1, wherein the first plurality of slits cover 50% of the plane in which both the centrally extending axis and the length (l) and width (w) of the first plurality of slits extend.

3. A lens according to claim 1, and further comprising a second plurality of slits extending entirely in the interior of the lens and comprising a length extending perpendicular to the centrally extending axis, a width extending parallel to the centrally extending axis and a thickness extending perpendicular to both the length and the width, the second plurality of slits being mutually parallel and covering between 40 and 60% of a plane in which both the centrally extending axis and the length and width of the second plurality of slits extend, the second plurality of slits extending in an angle different from zero with respect to the first plurality of slits.

4. A lens according to claim 3, wherein the second plurality of slits cover 50% of the plane in which both the centrally extending axis and the length and width of the second plurality of slits extend.

5. A lens according to claim 3, and further comprising a third plurality of slits extending entirely in the interior of the lens and comprising a length extending perpendicular to the centrally extending axis, a width extending parallel to the centrally extending axis and a thickness extending perpendicular to both the length and the width, the third plurality of slits being mutually parallel and covering between 40 and 60% of a plane in which both the centrally extending axis and the length and width of the third plurality of slits extend, the third plurality of slits extending in an angle different from zero with respect to both the first plurality of slits and the second plurality of slits.

6. A lens according to claim 5, wherein the third plurality of slits cover 50% of the plane in which both the centrally extending axis and the length and width of the third plurality of slits extend.

7. A lens according claim 1, wherein any one or more of the first plurality of slits, the second plurality of slits and the third plurality of slits terminate in a distance from an outer surface of the lens.

8. A lens according to claim 1, wherein the width of each slit of any one or more of the first plurality of slits, the second plurality of slits and the third plurality of slits is between 0.1 mm and ¼ of a height of the lens measured along the centrally extending axis (A).

9. A lens according claim 1, wherein the distance between adjacent slits of any one or more of the first plurality of slits, the second plurality Of slits and the third plurality of slits is between 0.1 mm and ¼ of a height of the lens measured along the centrally extending axis (A).

10. A lens according to claim 1, wherein the thickness of each slit of any one or more of the first plurality of slits, the second plurality of slits and the third plurality of slits is larger than 1000 nm.

11. A lens according to claim 1, wherein end surfaces of the slits of any one or more of the first plurality of slits, the second plurality of slits and the third plurality of slits facing towards adjacent slits are lambertian scattering.

12. A collimator comprising a lens according to claim 1.

13. A lighting device comprising a lens according to claim 1 and at least two light sources adapted for, in operation, emitting light the at least two light sources being positioned spaced apart and off-axis with respect to the centrally extending axis (A).

14. A lighting device according to claim 13, wherein the width of each slit of any one or more of the first plurality of slits, the second plurality of slits and the third plurality of slits of the lens is chosen such as to be larger than a wavelength of the light emitted by the at least two light sources and smaller than a distance between the at least two light sources.

15. A lighting device according to claim 13, wherein the thickness of each slit of any one or more of the first plurality of slits, the second plurality of slits and the third plurality of slits is chosen such as to be larger than a wavelength of the light emitted by the at least two light sources.

* * * * *